(12) United States Patent
Wendling et al.

(10) Patent No.: US 6,347,594 B1
(45) Date of Patent: Feb. 19, 2002

(54) NARROW PROFILE OPENER CAPABLE OF HIGH SPEED OPERATION

(75) Inventors: Ignatz Wendling; Larry Patrick Ferguson, both of Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/493,443

(22) Filed: Jan. 28, 2000

(51) Int. Cl.⁷ .................................................. A01C 5/00
(52) U.S. Cl. .................. 111/167; 111/195; 111/170; 172/559; 172/538
(58) Field of Search ........................... 111/190, 191, 111/192, 193, 194, 195, 196, 157, 163, 167, 170, 148; 172/538, 558, 559

(56) References Cited

U.S. PATENT DOCUMENTS

| | | | |
|---|---|---|---|
| 1,040,049 A | * 10/1912 | Steele | 111/193 |
| 2,771,044 A | * 11/1956 | Putifer | 111/193 X |
| 2,920,587 A | 1/1960 | Shriver | 111/80 |
| 3,362,361 A | * 1/1968 | Morrison, Jr. | 111/193 |
| 3,886,875 A | * 6/1975 | Ernst | 111/194 X |
| 4,196,679 A | * 4/1980 | Moore | 111/194 |
| 4,275,671 A | * 6/1981 | Baker | 111/195 |
| 4,307,674 A | 12/1981 | Jennings et al. | 111/85 |
| 4,407,207 A | 10/1983 | Dreyer | 111/85 |
| 4,408,551 A | 10/1983 | Keller et al. | 111/85 |
| 4,422,392 A | 12/1983 | Dreyer et al. | 111/52 |
| 4,596,200 A | 6/1986 | Gafford et al. | 111/85 |
| 4,691,645 A | * 9/1987 | Anderson | 111/195 X |
| 4,712,492 A | * 12/1987 | Murray | 111/193 X |
| 4,726,304 A | * 2/1988 | Dreyer et al. | 111/194 X |
| 4,760,806 A | 8/1988 | Bigbee et al. | 111/87 |
| 5,427,038 A | * 6/1995 | Ege | 111/193 X |
| 5,595,130 A | 1/1997 | Baugher et al. | 111/52 |
| 5,609,114 A | 3/1997 | Barton | 111/167 |
| 5,619,939 A | 4/1997 | Herman et al. | 111/163 |
| 5,626,196 A | 5/1997 | Hughes | 172/558 |
| 5,724,902 A | * 3/1998 | Janelle et al. | 111/194 X |
| 5,752,454 A | 5/1998 | Barton | 111/167 |

FOREIGN PATENT DOCUMENTS

| | | |
|---|---|---|
| EP | 0 117 745 | 9/1984 |
| FR | 2 041 925 | 1/1971 |

* cited by examiner

Primary Examiner—Victor Batson

(57) ABSTRACT

An opener assembly includes a single opener disk rotatably supported from a drawbar and angled approximately five degrees from the forward direction to define a shadow area behind the trailing surface of the disk. A material placement boot and delivery tube are supported adjacent the trailing surface substantially entirely within the shadow of the disk and have profiles conforming to the furrow profile. The boot and the outlet portion of the tube also lie within the periphery of the disk for protection. The tube has an upper portion with a round cross section which changes to an elliptical cross section towards the outlet to remain within the shadow while retaining high throughput capabilities. First and second wheels are supported on opposite sides of the disk to urge soil downwardly behind the outlet of the delivery tube immediately after the material is deposited. The immediate soil action caused by the closely spaced wheels pushes the material to the furrow bottom and prevents material bounce for more constant material depth. A short, lightweight wheel arm on the trailing side of the opener disk reduces assembly length and weight, and wheel bias towards the soil is primarily by spring action rather than weight for fast response to ground contours. The wheel on the leading side of the angled opener disk is supported behind the disk axis by an arm assembly which provides depth adjustment from the forward end of the drawbar. The wheels and the disk are angled generally in the same direction for handling trash.

49 Claims, 9 Drawing Sheets

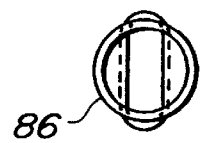
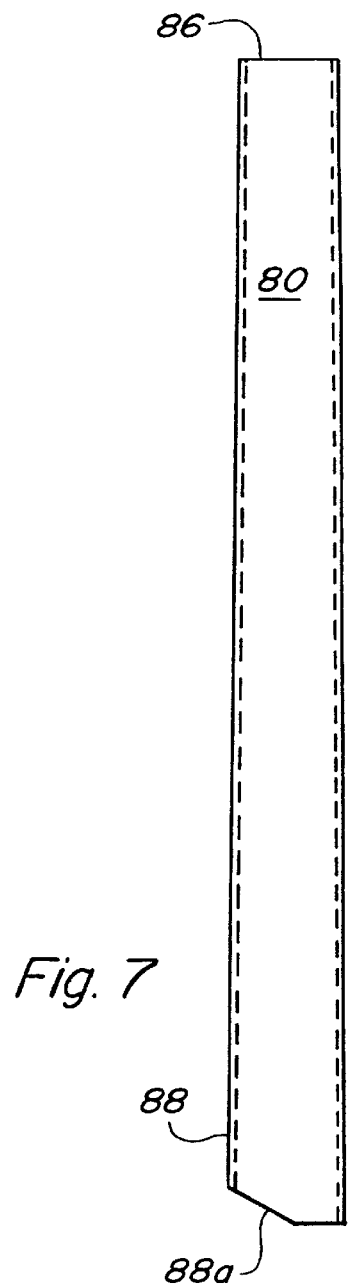
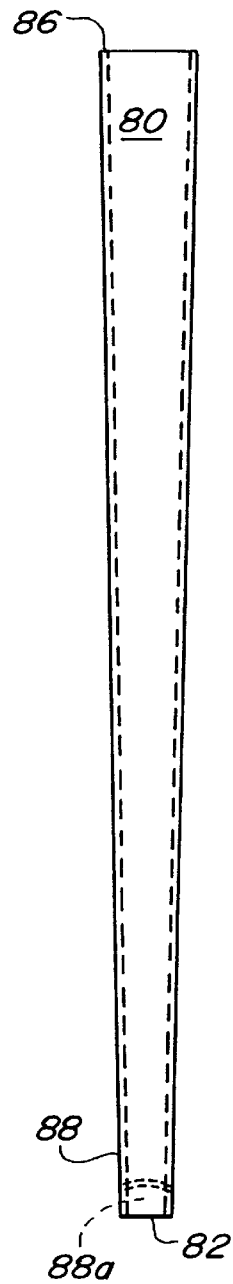
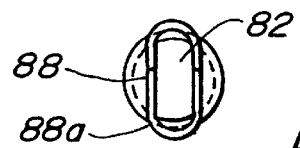

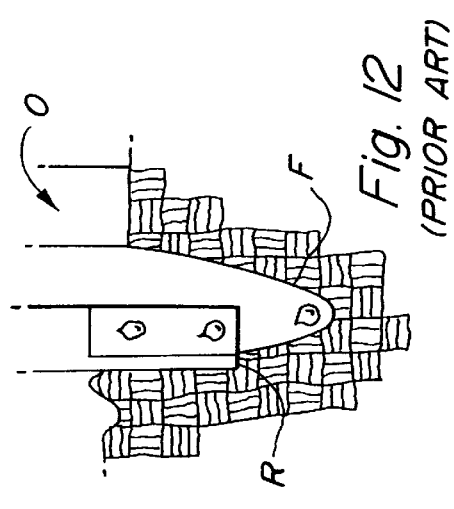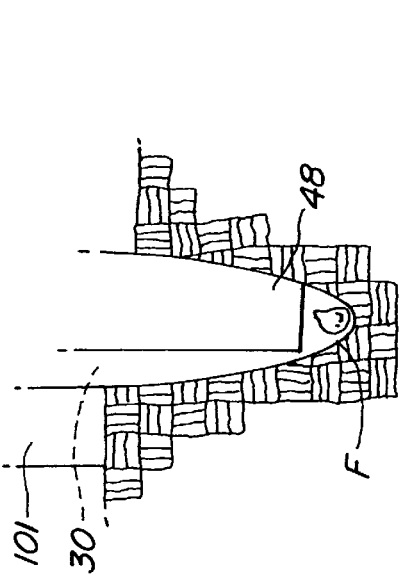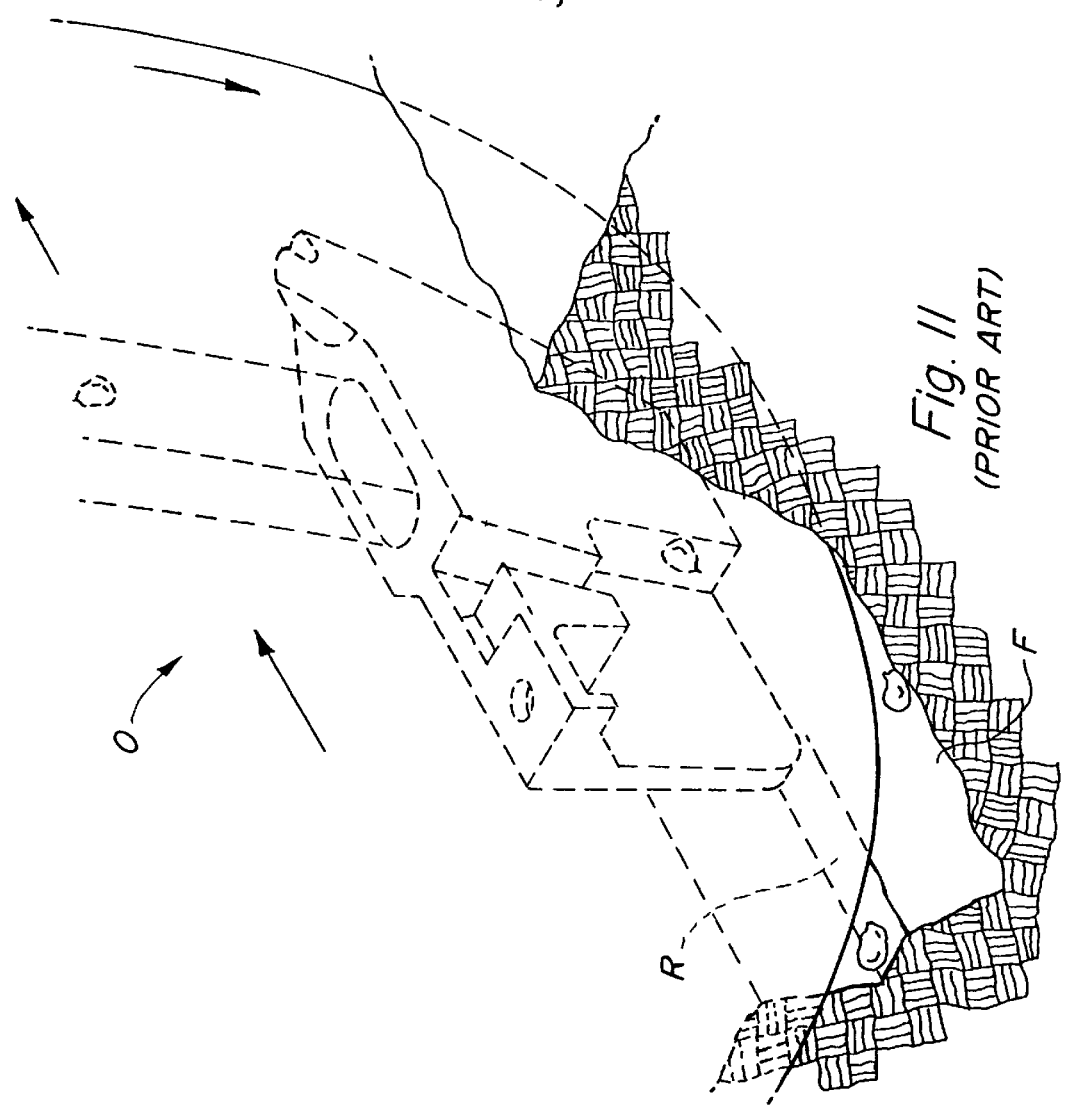

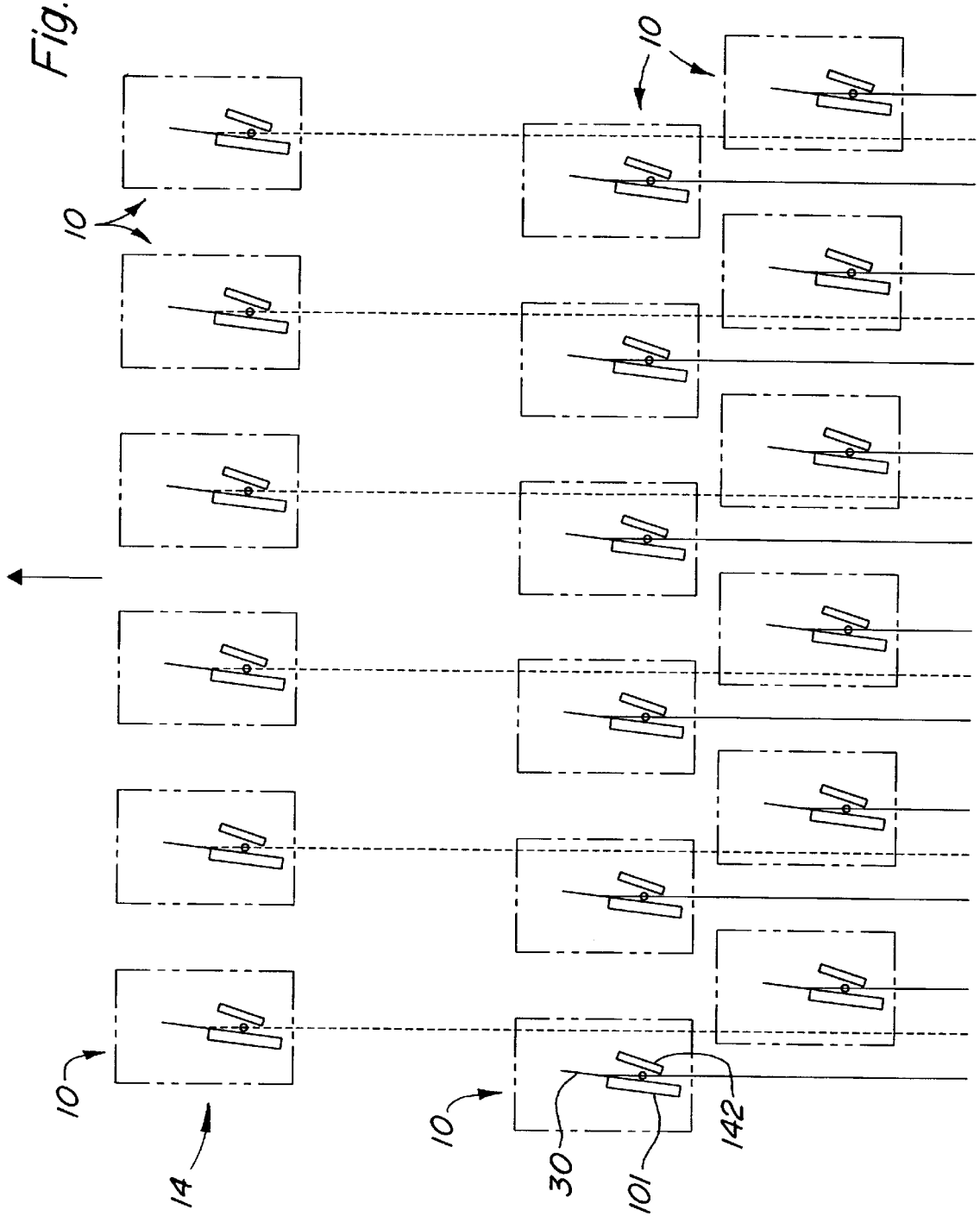

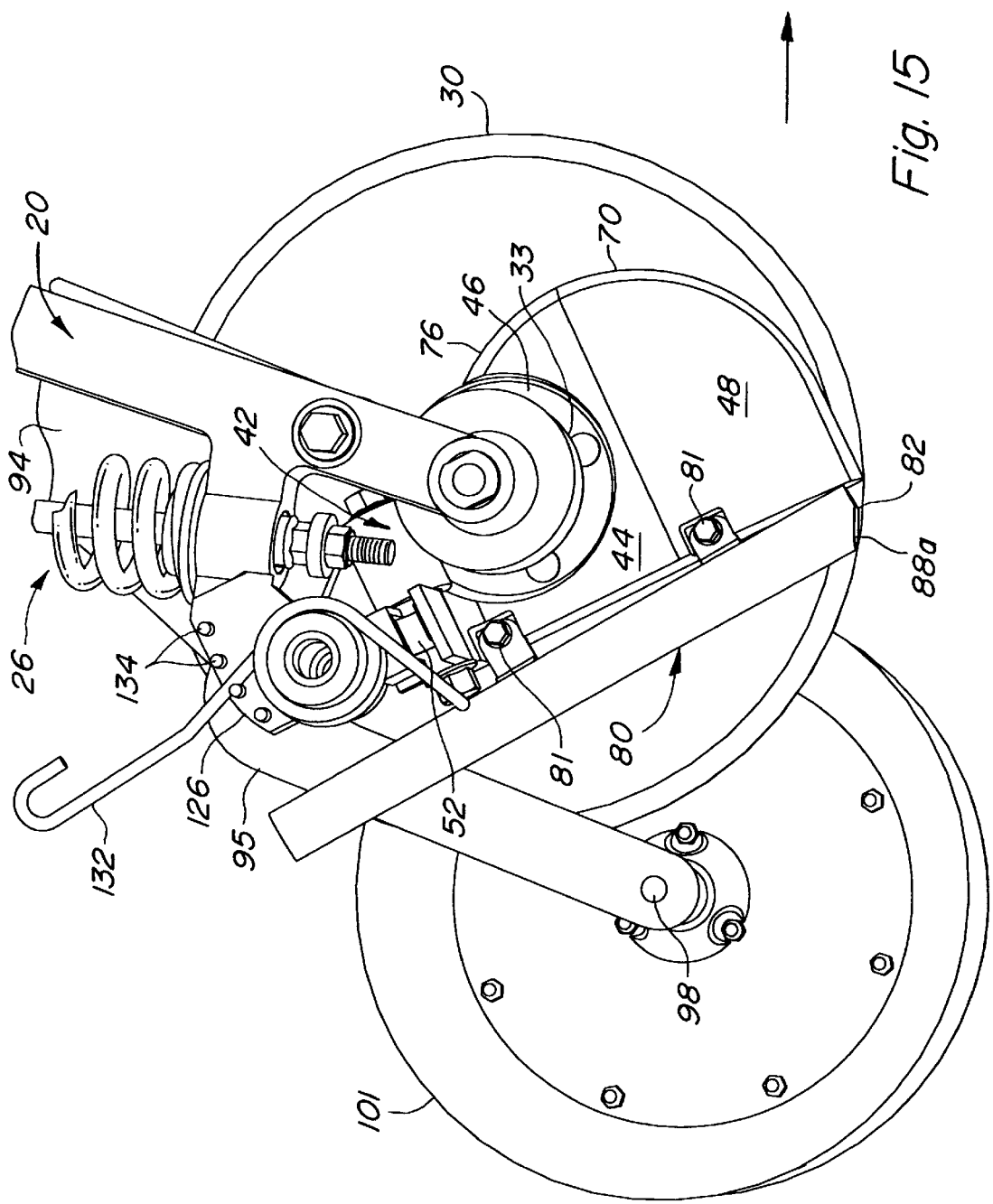

NARROW PROFILE OPENER CAPABLE OF HIGH SPEED OPERATION

BACKGROUND OF THE INVENTION

1). Field of the Invention

The present invention relates to an opener for a grain drill, planter or similar agricultural implement which deposits material such as seed or fertilizer in furrow and then closes the furrow.

2). Related Art

An opener arrangement for depositing seed or fertilizer in a furrow such as shown in U.S. Pat. No. 4,760,806 Bigbee et al includes an angled disk having a depth control wheel adjacent the leading face of the disk and a seed boot assembly including a seed tube on the trailing side of the disk. The wheel provides depth adjustment, cleans the leading face of the disk, and limits soil lifting and throw adjacent the disk. One or more closing or press wheels trail the disk to move soil and close the furrow over the material deposited from the seed tube. Such openers limit soil disturbance, but often a portion of the seed.boot or runner operates soil just outside the trench which increases soil disturbance, power requirements, wear and seed placement inconsistencies. The leading side wheel axis is close to the disk hub so the wheel operates forwardly of the area where the disk exits the soil so soil lift at the exit point can be a problem, particularly when the operating depth of the disk is increased. If the boot rides outside the furrow, tracking problems are also increased. An opener arrangement with a seed boot that remains substantially in the shadow of the disk when viewed from the forward direction is shown in U.S. Pat. No. 5,595,130 Baugher. In most single disk arrangements, however, a portion of the boot, as viewed from the side of the opener, is outside the periphery of the disk and is subject to damage when objects such as rocks are encountered in the ground.

With some opener arrangements, residue frequently wedges between adjacent openers, between the boot and the opener disk hub or the disk, or between the disk and one of the trailing wheels. The trailing wheel increases the overall length of the opener and does not track well when the implement is turned from the forward direction. The rearward wheel location requires a longer and heavier support arm arrangement less responsive to rapid changes in ground contours.

A further problem exists when efforts to reduce the size of the seed boot so the boot is within in the shadow of the opener disk results in a narrowed lower portion on the material delivery tube, particularly when the disk angle is approximately five degrees or less. Maintaining a high material rate is particularly important for high speed operation, and the narrowed lower portion of the tube reduces the rate at which material can be delivered to the furrow. Further, material delivery uniformity as well as rate may also be adversely affected by use of delivery tubes such as shown in the aforementioned U.S. Pat. No. 4,760,806 having other than a substantially vertical component. The problem of reduced delivery rate is further compounded when the tube is curved.

When an opener is depositing seeds in a furrow, placing the seeds at a constant depth is important for uniform germination and optimum plant growth. Often opener arrangements have closing or press wheels that trail the seed boot a substantial distance. The actual closing of the furrow occurs some time after the deposited material reaches the bottom of the furrow, and of the material has time to bounce from the bottom of the furrow and as a result the material is placed shallower than desired. At times, seeds can actually bounce completely out of the furrow so they lie on top of the ground and do not germinate. The trend toward higher speed planting and fertilizing for increased productivity increases the problem of material bounce and soil throw. Also, the seed boot runner in some presently available openers (see O of the prior art examples of FIGS. 11 and 12) can actually form a slight shelf or ridge (R) in the side of the furrow (F), especially when operating relatively deeply, and seed can lodge on the ridge rather than at the bottom of the furrow. A further problem arises when soil disturbed by the unwanted shelving or ridging process falls into the bottom of the furrow and affects seed placement.

Various seed bounce flaps or seed firming attachments such as shown in U.S. Pat. Nos. 5,092,255; 5,673,638 and 5,918,557 have been made available to limit bounce or firm the material in the furrow, but these result in added components, expense and maintenance and sometimes fail to completely solve the problems caused by bounce and ridging. Some wheel structures can decrease trash clearance and be a source of blockages, particularly in fields having high trash content.

BRIEF SUMMARY OF THE INVENTION

It is therefore an object of the present invention to provide an improved opener assembly. It is a further object to provide such an opener assembly which overcomes most or all of the aforementioned problems.

It is a further object of the present invention to provide an improved opener assembly particularly useful for high speed fertilizing or seeding operations. It is another object to provide such an assembly which is compact and has a narrow profile. It is a further object to provide such an assembly which reduces material bounce in the furrow.

It is a further object of the present invention to provide an improved opener assembly which has a profile wherein the material placement boot or runner is located within the shadow of the opener disk when viewed in the forward direction and within the periphery of the disk when viewed from the side to provide protection against damage from objects in the field. It is another object to provide such an assembly having a narrow profile and improved placement characteristics without sacrificing high material throughput capabilities.

It is still another object of the present invention to provide an improved opener assembly with a closing wheel arrangement which facilitates better material placement and higher speed operation than at least most previously available opener assemblies. It is another object to provide such an assembly that closes the furrow immediately after the material reaches the bottom of the furrow to eliminate bounce. It is yet another object to provide such an arrangement which closes the furrow from the top down and pushes the deposited material to the bottom of the furrow.

A further object of the present invention is to provide an opener with a closing wheel assembly which is compact, relatively light, and provides excellent trash clearing capabilities. It is another object to provide such an assembly which has a short support arm for compactness, good trailing characteristics and fast reaction time. It is yet another object to provide an opener with a closing system including a depth control and disk scraping wheel on one side of the disk cooperating with a closing wheel on the opposite side of the disk, both wheels located just behind an opener boot to close the furrow immediately after material is deposited in the furrow. It is still another object to provide such an opener which is less prone to blockages and which is ideally suited for narrow row spacings in high residue conditions.

It is another object of the invention to provide an improved opener assembly having a delivery tube arrangement with a high throughput for high speed operation. It is a further object to provide such an assembly which is compact and includes a unique compact hinge construction for biasing the delivery tube towards the furrow opening disk. It is yet another object to provide such an assembly having a high material throughput capability while maintaining the material delivery structure within the shadow of a single angled opener disk. It is another object to provide such an assembly which has an opener boot cross section which closely matches the cross section of the furrow formed by the opener disk to maximize material delivery output size and furrow wall holding capability while minimizing power requirements, soil disturbance and wear.

An opener assembly constructed in accordance with the teachings of the present invention includes a single opener disk rotatably supported from a drawbar and angled approximately five degrees from the forward direction to define a shadow area behind the trailing surface of the disk and open a furrow in the ground. A material placement boot and specially shaped material delivery tube are supported adjacent the trailing surface substantially entirely within the shadow of the disk and have profiles conforming to the furrow profile. The boot holds the furrow open while the delivery tube, which is vertical and positioned rearwardly of the disk axis, delivers seed to the bottom of the furrow. The delivery tube is substantially straight and has an upper portion with a round cross section which gradually changes to an elliptical cross section towards the outlet to remain within the shadow while retaining throughput capabilities that allow operational speeds well in excess of five miles per hour (8 km/hr). Conforming the boot to the furrow profile maximizes size for good soil holding and throughput while limiting soil disturbance, boot wear and power requirements. A compact tube pivot and horizontally disposed U-shaped spring arrangement fit into a limited space area to bias the boot and tube towards the disk.

To close the furrow immediately after material is deposited in the furrow bottom, first and second wheels are supported on opposite sides of the disk to urge soil downwardly behind the outlet of the delivery tube immediately after the material is deposited. The furrow walls are collapsed from the top down and provide a soil wave ahead of the wheels. The soil action caused by the closely spaced wheels pushes the material to the furrow bottom and results in a very constant material depth. The immediate soil action also prevents material bounce and results in substantially better placement control than at least most opener assemblies having closing wheels that trail the opener disk and therefore provide delayed closing action. The close placement of the wheel on the trailing side of the opener disk reduces opener assembly length, provides better tracking, and reduces the weight of the wheel arm so the trailing side wheel, which is adjustably biased into contact with the soil primarily by spring action rather than weight, can respond more quickly to ground contours. When anhydrous ammonia or a similar material is placed in the soil by the opener, the advantageous closing action provided by the unique wheel. arrangement immediately seals the furrow to prevent loss of gas.

The depth adjusting wheel on the leading side of the angled opener disk is supported behind the disk axis by an arm assembly which provides convenient depth adjustment from the forward end of the drawbar. The leading side wheel pushes soil around the trailing edge of the disk to collapse the furrow wall immediately after material is deposited in the furrow and provides a scraping action against the disk and prevents soil from lifting out of the furrow as the disk rotates out of the ground, particularly in wet sticky soil conditions and when the disk is set for deep operation,. By moving the wheel rearwardly from a conventional position such as exemplified in the aforementioned U.S. Pat. No. 4,760,806, a smaller disk can be utilized to provide deeper ground penetration while retaining good resistance to soil lifting in the area where the disk exits the soil. The leading side wheel and the closing wheel are both angled in the same direction for improved movement of trash between the wheels to prevent clogging. Better overall machine trash flow, particularly in high trash conditions, is another benefit of having the wheels angled in the same direction. By utilizing the like-angled wheels and staggering the spacing of the opener assemblies, trash from one opener is prevented from impinging directly on an adjacent opener.

These and other objects, features and advantages of the present invention will become apparent to one skilled in the art upon reading the following detailed description in view of the drawings.

BRIEF DESCRIPTION OF THE DRAWINGS

FIG. 7 is a side view of the delivery tube utilized with the opener assembly of FIG. 1.

FIG. 8 is a front view of the delivery tube of FIG. 7.

FIG. 9 is a top view of the tube of FIG. 7.

FIG. 10 is a bottom view of the tube of FIG. 7.

FIG. 11 is a perspective view of a prior art single disk opener (a right-hand opener) illustrating a ridging and seed placement problem typical of such an opener.

FIG. 12 is a view showing the cross section of a furrow formed with the prior art opener of FIG. 11 with a seed lodging ridge formed by the opener and illustrating the soil disturbance on the side of the opener disk opposite the gauge wheel side.

FIG. 13 is a view showing a portion of the boot and disk of the present invention (a left-hand opener) with the boot having a profile matching the profile of the furrow and illustrating the lack of soil disturbance on the side of the opener disk opposite the gauge wheel side.

FIG. 14 is schematic representation of an implement with a plurality of the opener assemblies of FIG. 1 arranged for narrow row spacings.

FIG. 15 is a rear perspective view of the opener assembly, looking towards the trailing side of the disk, with parts removed to better show the construction of the boot and the delivery tube.

DETAILED DESCRIPTION OF THE DRAWINGS

Figure 1:
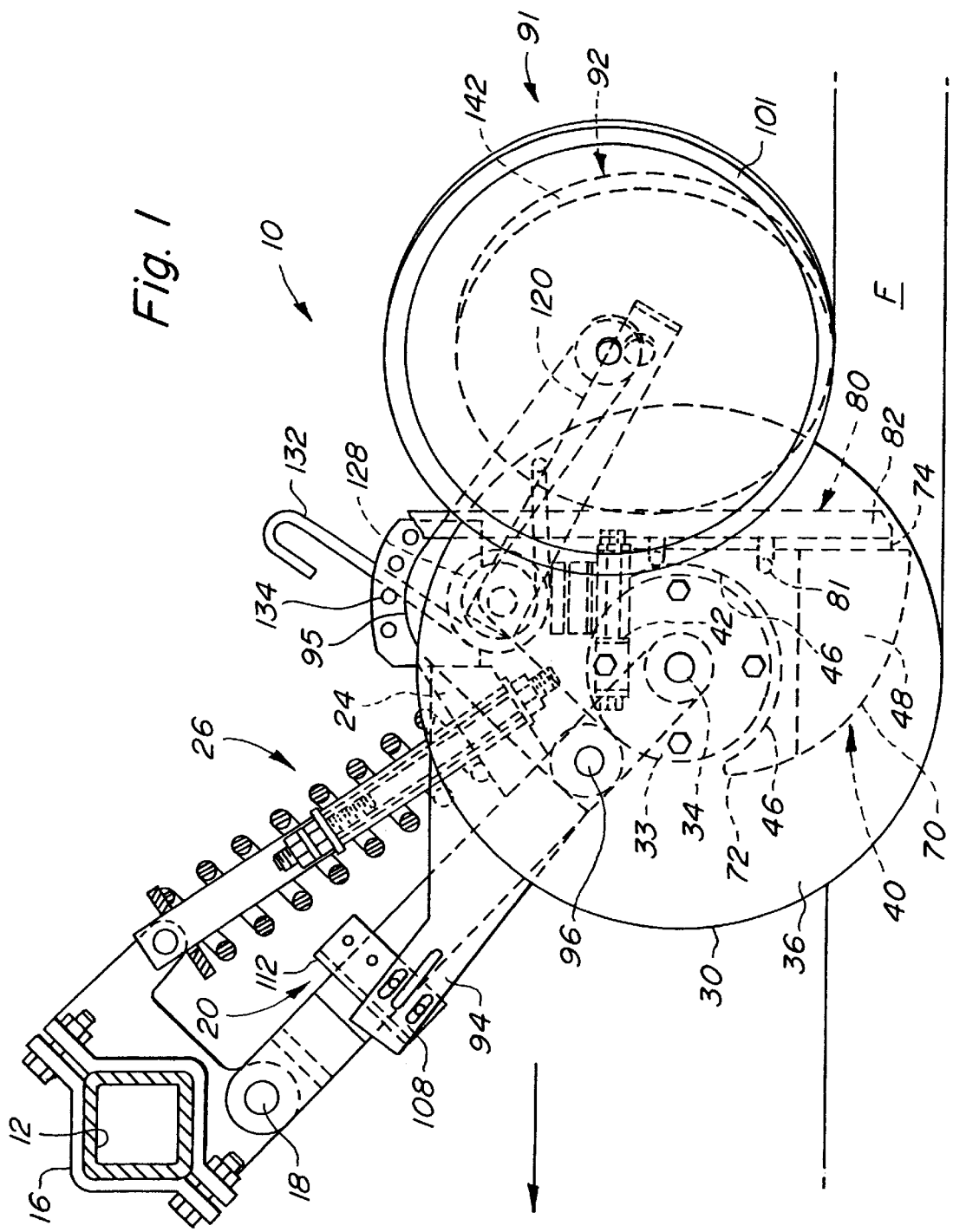
FIG. 1 is a side view of an opener assembly.

Referring now to FIG. 1, therein is shown an opener assembly 10 connected to a transversely extending frame tube or toolbar 12 of an implement such as a grain drill for forward movement (arrow) over the ground to deposit material such as seed and/or fertilizer in a furrow F formed by the assembly 10. A bracket 16 is connected to the toolbar 12 and includes a lower pivot 18 supporting the upper forward end of a drawbar 20. A spring support 24 is connected near the lower aft end of the drawbar 20, and a down pressure spring and tension link assembly 26 biases the aft end downwardly and limits downward movement of the drawbar 20 about the pivot 18 when the toolbar 12 is rocked from the field working position shown in FIG. 1 to a transport position.

A disk 30 is supported for rotation about an axis 32 by a wheel hub 33 and a bearing assembly 34 located at the lower aft end of the drawbar 20. The axis 32 is angled slightly, preferably on the order of five degrees, from a direction transverse to the forward direction so that the disk 32 is steered slightly from the forward direction to define a leading side 36 and a trailing side 37 (FIG. 5. A protective shadow area indicated at 38 is thereby provided by the disk 30 adjacent the trailing side 37.

A material placement boot assembly 40 is pivotally connected to the lower aft end of the drawbar 20 by a pivot 42 located above the bearing assembly 34 and extending generally in the fore-and-aft direction. An upper boot portion 44 depends from the pivot 42 adjacent the hub 33 and includes an arc-shaped recess area 46 conforming generally to and wrapping partially around the hub 33. A lower boot portion 48 is connected to the portion 44. The area 46 wraps around the hub 33 substantially more than 180 degrees and forms a smooth, residue shedding surface around the disk axis to help prevent wedging of material between the disk axis and the boot.

Figure 3:
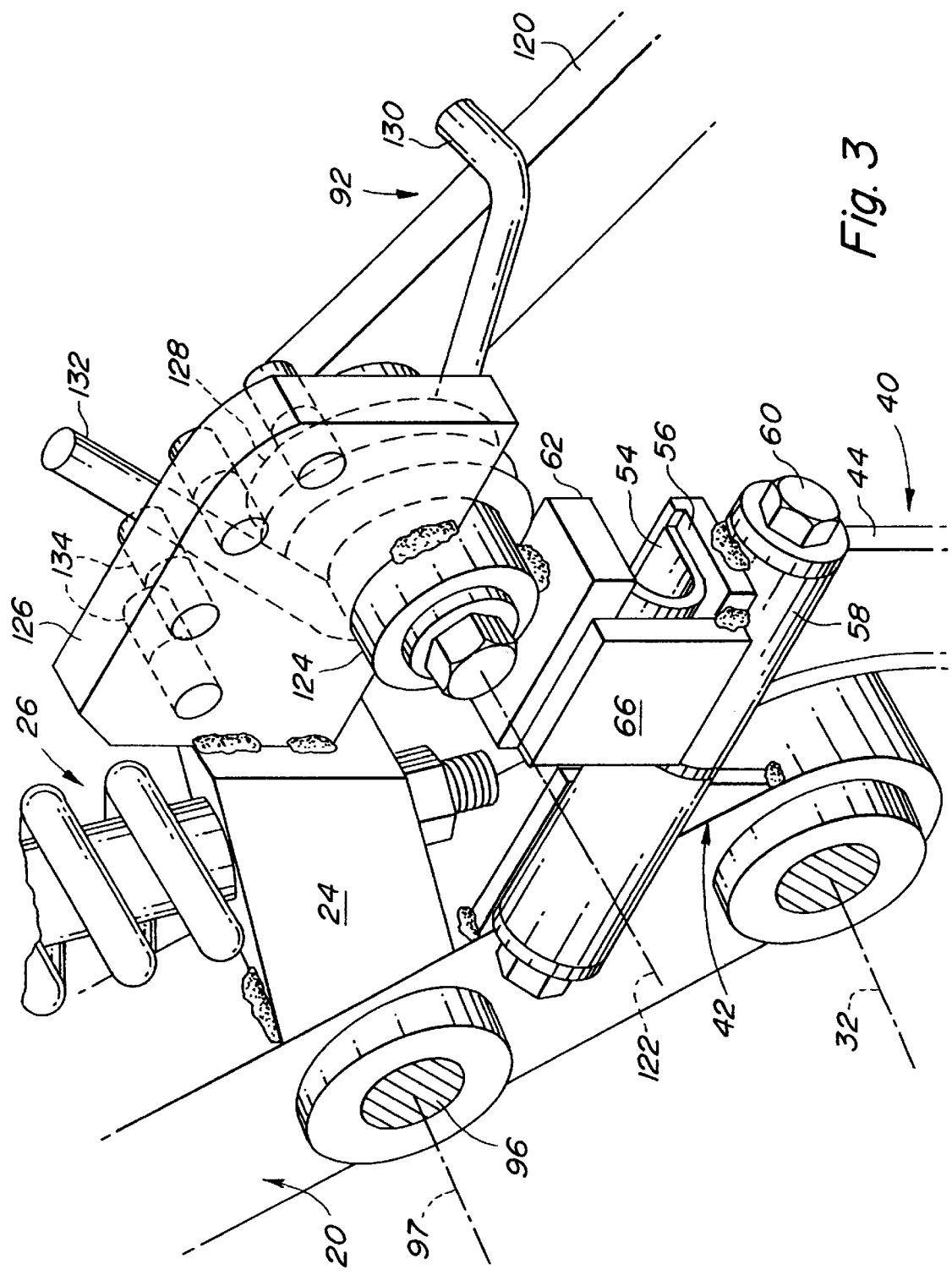
FIG. 3 is an enlarged perspective view of the seed boot hinge and closing wheel support area of the assembly of FIG. 1.
Figure 4:
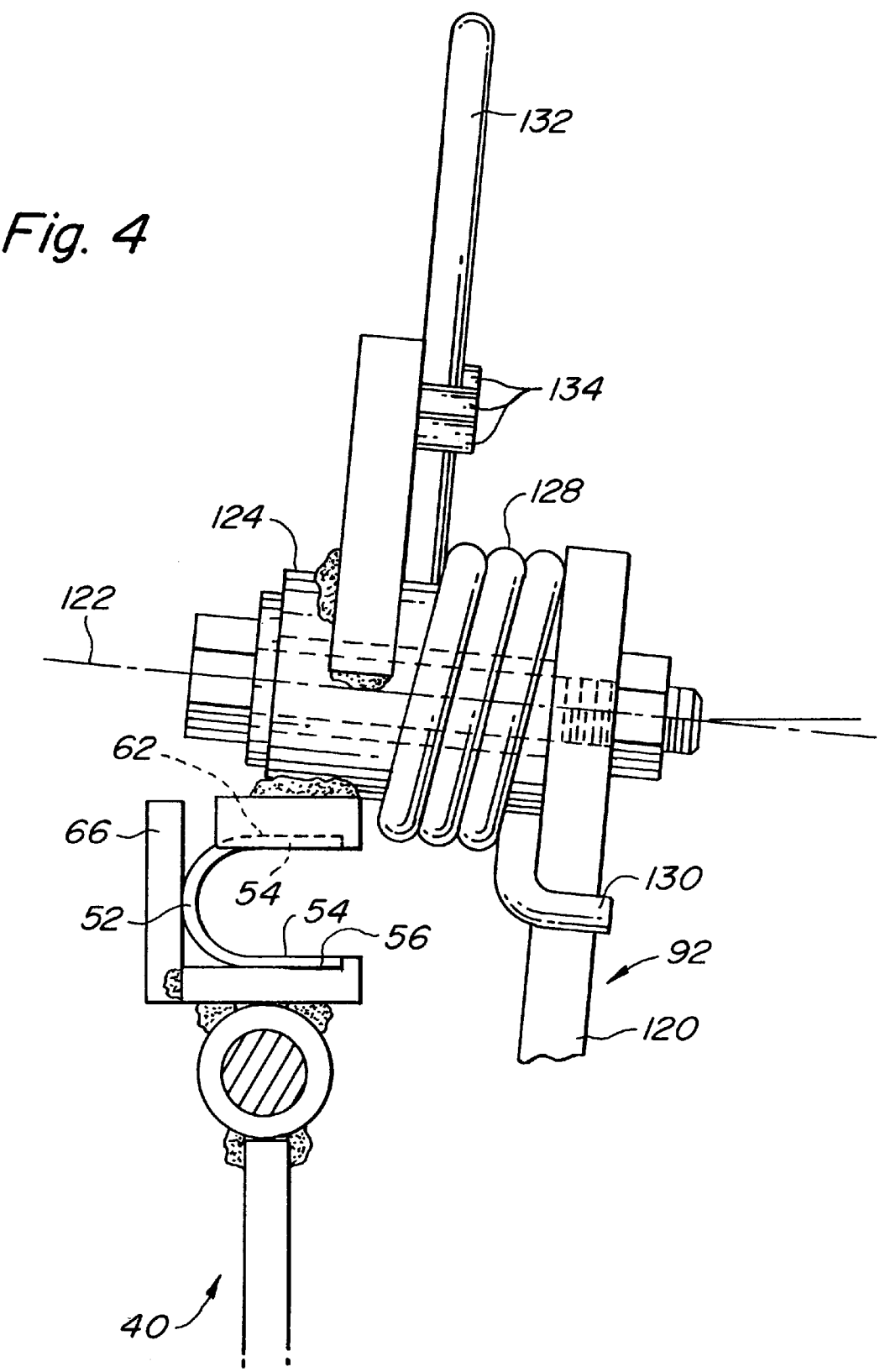
FIG. 4 is a rear view of the support area of FIG. 3.

A U-shaped spring 52 includes generally horizontally disposed side legs 54, one of which is secured against a recessed planar surface member 56 (FIG. 3) fixed to a journal area 58 of the upper boot portion 44. A pivot pin 60 pivotally connects the journal area 58 to the drawbar 20. The other side leg 54 of the spring 52 is secured against a second recessed planar surface member 62 which is fixed relative to the lower aft end of the drawbar 20. The spring 52 urges the boot assembly 40 in the clockwise direction (as viewed in FIG. 3) about the axis of the pivot 42 towards the trailing side 37 of the disk 30. A stop member 66 fixed to the upper boot portion 44 bottoms against the inside edge of the member 62 to limit pivoting in the clockwise direction. The biasing arrangement is narrow and is contained generally within the shadow of the drawbar 20 to help provide a compact profile for improved trash flow and component protection.

Figure 2:
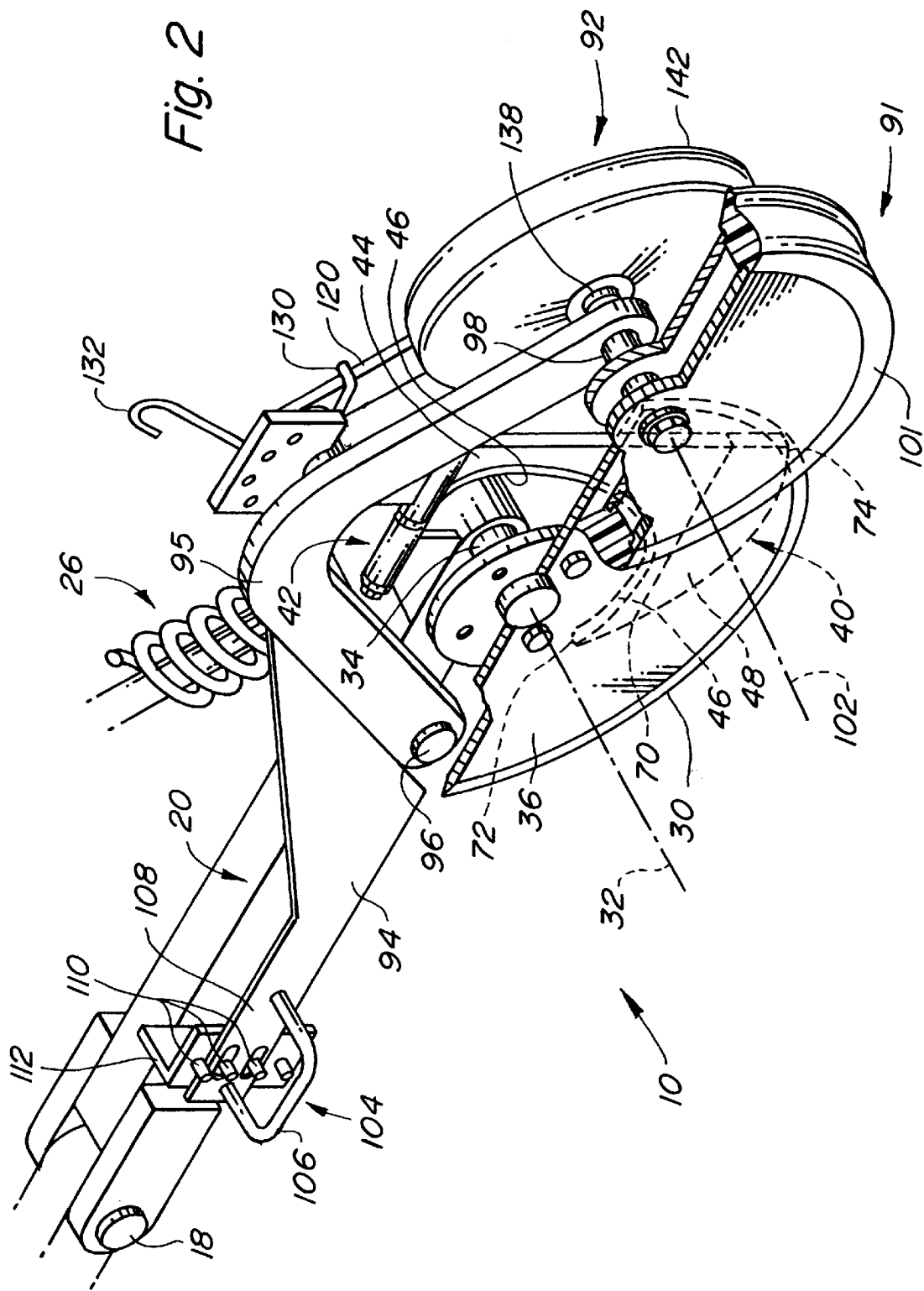
FIG. 2 is a rear perspective view of the opener of FIG. 1 with portions broken away.
Figure 6:
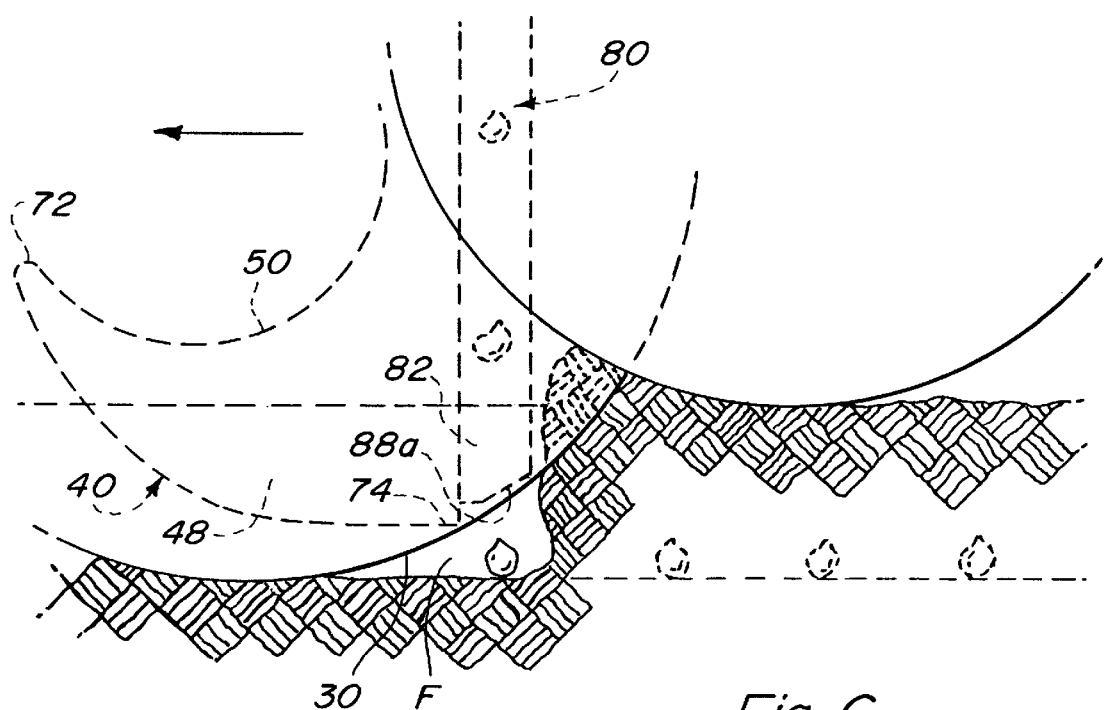
FIG. 6 is an enlarged partial side view of the assembly of FIG. 1 showing the material boot and tube within the periphery of the opener disk.

The lower boot portion 48 is preferably fabricated as a wear-resistant casting having an edge 70 curving downwardly and rearwardly from a leading point area 72 forwardly and below the disk axis 32 to a lower rearmost portion 74 located rearwardly of the axis 32 adjacent the periphery of the disk 30 (FIGS. 1, 2 and 6). Viewed from the forward direction, the entire boot 40 is located within the protective shadow area 38 of the disk 30, and viewed from the side (FIGS. 1, 6 and 15), the boot 40 is also located within the periphery of the disk 30 for a high degree of protection. The lower boot portion 48 is shaped to match the furrow wall regardless of the operating depth selected for the assembly. Matching the boot shape to the furrow wall substantially reduces or eliminates soil disturbance because the boot is running in the trench created by the leading edge of the disk. As a result, a much wider seed tube can be protectively mounted behind the boot than with a boot that fails to match the furrow wall. Conforming the boot to the furrow keeps loose soil from falling in the trench before the material is placed. Also, when the machine 14 is turning in the direction that would normally result in a narrower trench, the boot helps keep the trench open so the material can still be placed in the lowermost portion of the furrow.

A seed or material delivery tube 80 is connected by bolts 81 (FIG. 15) to the rear of the boot assembly 40 and has a profile which, when viewed from the forward direction, lies substantially within the shadow 38 of the disk 30. The tube 80 has a lowermost outlet area 82 directly behind the lower boot portion 48 and in the shadow 38. As seen in the side views of FIGS. 1 and 6, the tube 80 is also within the periphery of the disk 30 for protection against rocks and the like. To maintain a high material throughput capability for accommodating high speed operation while retaining the narrow profile that is protected by the disk, the tube 80 gradually tapers from an upper round portion 86 (FIGS. 7–10), which attaches to and is fed from the material supply tube (not shown), to a narrow lower section 88 with an elliptical cross section that protectively fits behind the boot portion 48. The aft portion 88a of the lower section is notched at an angle of approximately 30 degrees from the horizontal so that the outlet opens rearwardly and the lower section 88 remains within the periphery of the disk 30. The lower section 88 has a cross sectional area only slightly smaller than that of the upper round portion 86. The tube 80 is straight and vertically orientated with a slight angle to the disk 30 and a very gradual taper over its whole length to avoid the seeds bouncing and allow high seeding or material delivery rates at very high implement speeds. By way of example only, the transition length for a delivery tube length of about 14 inches (356 mm) is approximately 12 inches (305 mm), and the upper round portion 86 has a diameter of about 1.4 inches (35 mm) which narrows to lower section width of about 0.7 inches (18 mm) and elongates in the fore-and-aft direction (FIGS. 9 and 10). Providing the long transition reduces seed bounce and retains high capacity for the better material placement in the furrow at high speeds. The tube 80 may also be an anhydrous ammonia tube, lying in the shadows of the drawbar and boot and having a diameter of about ½ inch (13 mm), for delivering a gaseous material to the bottom of the trench formed by the wheel 30, or the tube may supply liquid fertilizer or the like.

A first wheel assembly 91 is adjustably supported adjacent the leading side 36 of the disk 30, and a second wheel assembly 92 is adjustably supported adjacent the trailing side 37 of the disk 30. The assembly 91 includes an arm member 94 having a central portion 95 connected by a pivot 96 to the drawbar 20 forwardly of the disk axis 32 for rocking about an axis 97. The arm member 94 extends upwardly in the rearward direction over the hub 33 and then downwardly to a connection with an axle member 98 supporting a first wheel 101 for rotation about a first wheel axis 102 which is generally parallel to the disk axis 32 and is located in the fore-and-aft direction near the aft edge of the disk 30. The first wheel 101 is supported for rotation against the first side 36 of the disk 30 for cleaning the disk, providing depth control, and providing a closing function for one side of the furrow F. The wheel 101 also keeps soil from boiling up at the rear of the disk 30 near the area where the disk exits the ground.

The first wheel assembly 91 includes depth adjustment structure 104 located near the front of the opener assembly 10 for convenient access by an operator. The structure includes a handle 106 connected to an apertured forward section 108 of the arm member 94. A series of pins 110 project outwardly from a bracket 112 fixed to the forward portion of the drawbar 20. The forward portion of the arm member 94 is preferably fabricated from a resilient metal plate material so the operator can grasp the handle 106 and pull the section 108 outwardly from the pins 110 to pivot the arm member 94 for the desired vertical location of the wheel 101 relative to the disk 30. Once the wheel 101 is adjusted for the desired disk operating depth, the operator releases the handle 106 which springs back towards the drawbar 20 so the apertures of the section 108 are captured by the pins 110 to secure the assembly in 91 in the desired position.

The second wheel structure 92 includes a wheel support arm 120 having a forward upper end pivotally connected to the aft end of the drawbar 20 for rocking about an axis 122 above the disk axis 32. A journal 124 is fixed to a support 126 which in turn is connected to the spring support 24. A down pressure spring 128 includes coils encircling the journal 124 and an offset leg 130 bearing down against the top edge of the arm 120. An adjusting handle 132 is movable between different pairs of pins 134 which project from the support 126 to vary the down pressure of the arm 120. The arm 120 extends rearwardly and downwardly to a bend location 135 and then to a connection with an axle member 138 mounting a second or closing wheel 142 for rotation about a wheel axis 143 which is angled in the same general direction as the first wheel axis 102. The axis 143 is angled slightly downwardly in the outward direction to tilt the wheel 142 from a vertical attitude for better furrow closing action. The angle of the axis 143 relative to the transverse direction is also greater than that of the axis 102.

Figure 5:
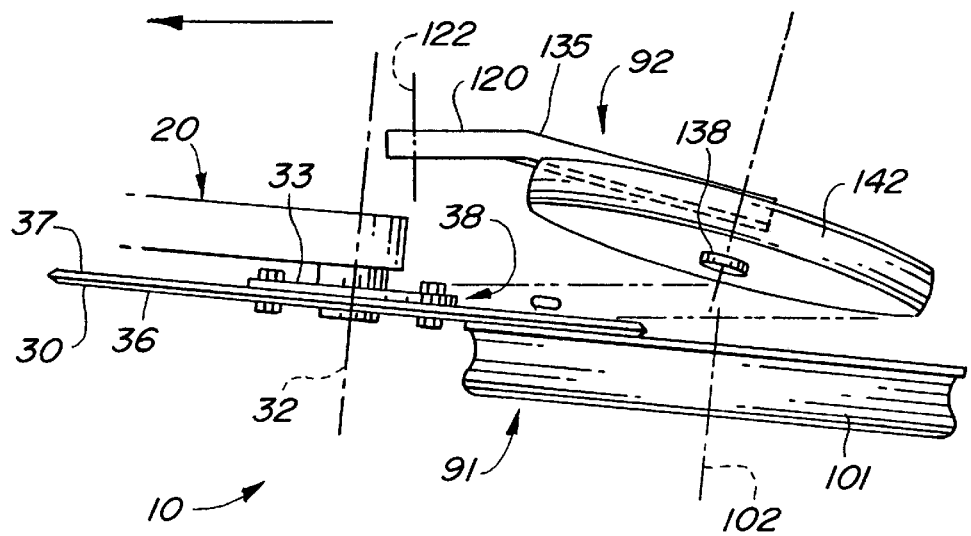
FIG. 5 is a top view of a portion of the closing wheel structure for the assembly of FIG. 1.

The pivot axes of the closing wheel arm 122 is at an angle to the horizontal (about five degrees as shown in FIG. 5) to increase the lateral clearance relative to the gauge wheel 101 when the closing wheel 142 runs over residue piles. The wheel 142 moves outwardly away from the disk 30 as the arm 122 rocks upwardly to help clear trash that otherwise could cause a blockage. The close placement of the wheel 142 to the disk axis 32 on the trailing side 37 of the opener disk 30 reduces overall assembly length, provides better tracking, and reduces the weight of the wheel arm compared to opener assemblies wherein the closing wheel trails the disk. The wheel 142 is primarily biased by the spring 128 into contact with the soil, rather than by weight, for faster response to ground contours.

The wheels 101 and 142 as seen in FIG. 1 contact the ground on opposite sides of the furrow immediately behind the outlet 82 of the delivery tube 80 closely adjacent the area where the disk 30 exits the ground. The wheel contact areas are substantially side-by-side to collapse the opposite sides of the furrow over the deposited material immediately after that material reaches the lowermost portion of the furrow to eliminate bounce and assure uniform depth. The closely spaced wheels 101 and 142 provide a soil wave which leads the wheels and helps implement the advantageous furrow closing action. When the tube 80 is an anhydrous ammonia tube, the advantageous soil action provided by the above-described arrangement seals the soil immediately and substantially reduces loss of material from the ground. The configuration of openers shown in FIG. 14 is one example of an advantageous staggered spacing utilizing the like-angled wheels and disks of the opener assemblies 10 to prevent trash from one opener from impinging directly on an adjacent opener while providing for narrow row spacings.

Having described the preferred embodiment, it will become apparent that various modifications can be made without departing from the scope of the invention as defined in the accompanying claims.

What is claimed is:

1. An opener for depositing material in a furrow in the ground and for closing the furrow over the material, the opener comprising:

a drawbar adapted for movement in a forward direction over the ground;

an opener disk supported from the drawbar for rotation about a disk axis to form the furrow in the ground, the opener disk having first and second sides and leading and trailing edges;

a first ground engaging wheel supported adjacent the first side of the disk;

a second ground engaging wheel supported adjacent the second side of the disk;

a material placement boot located on the second side of the disk; and wherein the first and second ground engaging wheels have forward most portions adjacent the trailing edge of the disk, the wheels also including lowermost portions engaging the ground adjacent the trailing edge on opposite sides of the furrow and cooperating to positively close the furrow immediately behind the material placement boot.

2. The opener as set forth in claim 1 wherein the forward most portions of the first and second ground engaging wheels are located rearwardly of the disk axis and forwardly of the trailing edge of the disk.

3. The opener as set forth in claim 1 including a first support arm adjustably connected to the drawbar and rotatably mounting the first ground engaging wheel for rotation about a first wheel axis.

4. The opener as set forth in claim 3 wherein the first wheel axis is generally parallel to the disk axis and wherein the disk axis is offset at an angle of five degrees or less from a direction transverse to the forward direction.

5. The opener as set forth in claim 3 further comprising a second support arm pivotally connected to the drawbar and rotatably mounting the second ground engaging wheel for rotation about a second wheel axis, a spring member biasing the second ground engaging wheel downwardly, wherein the second wheel axis is angled to help positively close the furrow immediately behind the placement boot.

6. The opener as set forth in claim 5 wherein the first and second support arms are supported adjacent the second side of the disk, the first support arm extending rearwardly of the trailing edge of the disk, wherein the first wheel axis is located rearwardly adjacent the disk.

7. The opener as set forth in claim 3 wherein the first support arm includes an integral indexing portion biased towards the drawbar, and a mating portion on the drawbar selectively receiving the indexing portion in one of a plurality of positions to vary depth of penetration of the disk in the ground.

8. The opener as set forth in claim 1 wherein the disk is angled from the forward direction so that the first side of the disk defines a leading surface, and wherein the first wheel comprises a depth control and furrow closing wheel, the first wheel pushing soil around the trailing edge of the disk and the second wheel cooperating with the first wheel to provide furrow closing.

9. The opener as set forth in claim 2 wherein the material placement boot has a lower rearward extremity located, in the forward direction, between the disk axis and a location near the forward most portions of the wheels so that the wheels tend to urge the soil over the furrow as the materialis deposited in a lower portion of the furrow.

10. The opener as set forth in claim 9 including a material delivery tube extending vertically from an upper central portion of the disk to an outlet located adjacent the lower rearward extremity of the material placement boot.

11. The opener as set forth in claim 10 wherein the material delivery tube comprises a delivery tube for delivering material such as anhydrous ammonia or liquid fertilizer to the furrow, and wherein the first and second wheels seal the furrow immediately as the material is delivered into the furrow to prevent escape of gas.

12. The opener as set forth in claim 10 wherein the material delivery tube delivers seeds to a lowermost portion of the furrow, the wheels tending to urge the soil over the furrow as the material is deposited in a lower portion of the furrow so the seeds are prevented from bouncing out of the lowermost portion of the furrow.

13. The opener as set forth in claim 1 wherein the disk is angled from the forward direction to define a disk shadow area, and wherein the material placement boot is located in the shadow area and substantially within the furrow behind the leading edge.

14. The opener as set forth in claim 13 wherein the material placement boot extends around an area adjacent and above the disk axis to an uppermost boot area, the uppermost boot area also lying in the shadow area and within the furrow behind the leading edge to generally eliminate soil disturbance by the boot and uppermost boot area.

15. The opener as set forth in claim 13 wherein the disk is angled from the forward direction approximately five degrees or less to define a narrow opener profile, the disk forms a furrow profile conforming to the shadow area, and the boot lies entirely within the furrow profile and generally fills the furrow profile to maintain loose soil out of the furrow until the material is deposited in the furrow.

16. The opener as set forth in claim 1 wherein the material placement boot is supported for pivoting relative to the drawbar about a generally horizontal axis, and including a generally horizontally supported U-shaped spring located above the generally horizontal axis for trash clearance and biasing the material placement boot towards the second side of the disk.

17. The opener as set forth in claim 1 wherein the disk is angled from the forward direction to define a disk shadow area and provides a furrow with a preselected profile, and wherein the material placement boot has a profile which matches the preselected profile.

18. The opener as set forth in claim 17 wherein the disk includes a hub and the material placement boot extends around the hub substantially greater than 180 degrees and forms a smooth, residue shedding surface which wraps around the disk axis.

19. The opener as set forth in claim 18 wherein the material placement boot includes a curved leading edge to resist soil build up.

20. The opener as set forth in claim 1 wherein the disk includes a periphery and the material placement boot, as viewed from a side of the disk, lies substantially entirely within the periphery so the disk protects the material placement boot from breakage when hard objects are encountered by the opener.

21. An opener for depositing material in a furrow in the ground and for closing the furrow over the material, the opener comprising:

a fore and aft extending drawbar adapted for movement in a forward direction over the ground;

an opener disk supported from the drawbar for rotation about a disk axis offset from a direction transverse to the forward direction to form the furrow in the ground and define a shadow area, the opener disk having first and second sides, and a periphery with leading and trailing edges;

a first ground engaging wheel supported adjacent the first side of the disk;

a second ground engaging wheel supported adjacent the second side of the disk; and a material placement boot located on the second side of the disk and having a material placement outlet forwardly adjacent the first and second ground engaging wheels for depositing material in a bottom area of the furrow, wherein the ground engaging wheels have ground engaging portions located forwardly of the trailing edge of the disk and forcing soil down over the material deposited in the furrow before the material can move upwardly from the bottom area of the furrow.

22. The opener as set forth in claim 21 wherein the ground engaging portions and the material placement boot are located, in a fore and aft direction, between the disk axis and the trailing edge of the disk.

23. The opener as set forth in claim 21 wherein the ground engaging portions are located generally an equal distance from the material placement boot so that the ground engaging wheels force the soil down on opposite sides of the furrow at approximately the same time.

24. The opener as set forth in claim 21 including a downwardly biased wheel arm having a leading end pivotally connected to the drawbar for rotation about a wheel arm axis and a trailing end rotatably mounting the second ground engaging wheel, the wheel arm axis angled with respect to a direction transverse to the forward direction so that as the wheel arm moves upwardly against the bias, the second ground engaging wheel moves outwardly from the disk to thereby help clear trash from between the second ground engaging wheel and the disk.

25. The opener as set forth in claim 21 wherein the first ground engaging wheel comprises a depth control and disk scraping wheel, the wheel located adjacent an area where the disk exits the ground thereby substantially preventing upward soil pull-out of the furrow.

26. The opener as set forth in claim 21 wherein the leading ground engaging portion of the first ground engaging wheel is located closely adjacent the trailing edge of the disk and urges soil around the trailing edge of the disk to close one side of the furrow.

27. The opener as set forth in claim 21 including a support arm having an aft end supporting the first ground engaging wheel, and an attaching portion pivotally connected to drawbar at a location forwardly of the disk axis.

28. The opener as set forth in claim 27 wherein the support arm includes a forward end located forwardly of the attaching portion adjacent a forward portion of the drawbar and movable relative to the drawbar to adjust a position of the second ground engaging wheel relative to the disk.

29. The opener as set forth in claim 28 including structure adjustably securing the forward end of the support arm relative to the forward portion of the drawbar and providing vertical adjustment of the second ground engaging wheel relative to the disk from a location near a forward portion of the opener.

30. The opener as set forth in claim 21 wherein the material placement outlet is located in the shadow area of the disk and entirely within the furrow formed by the disk.

31. The opener as set forth in claim 21 wherein the material placement outlet, when viewed from a side of the opener, is located entirely within the periphery of the disk so the disk protects the outlet against hard objects in the ground.

32. The opener as set forth in claim 21 wherein the material placement boot is located in the shadow of the disk and, when the opener is viewed from the side, the boot is entirely within the periphery of the disk.

33. An opener for depositing material in a furrow in the ground and for closing the furrow over the material, the opener comprising:
   a fore and aft extending drawbar adapted for movement in a forward direction over the ground;
   an opener disk supported from the drawbar for rotation about a disk axis to form the furrow in the ground, the opener disk having a periphery with leading and trailing edges;
   a material placement boot located on one side of the disk and having a material placement outlet located adjacent the periphery at a lowermost portion of the opener disk for depositing material in a bottom area of the furrow, wherein the boot, when viewed from a side of the opener in a direction transverse to the forward direction, is located entirely within the periphery of the disk so that the boot is protected against damage by the disk; and
   wherein the disk axis is offset from a direction transverse to the forward direction to define a shadow area in the fore and aft direction, and wherein the material placement boot, when viewed from the forward direction, is entirely within the shadow area.

34. The opener as set forth in claim 33 including a trailing wheel having a leading ground engaging portion located forwardly of the trailing edge of the disk and forcing soil down over the material deposited in the furrow before the material can move upwardly from the bottom area of the furrow.

35. An opener for depositing material in a furrow in the ground and for closing the furrow over the material, the opener comprising:
   a fore and aft extending drawbar adapted for movement in a forward direction over the ground;
   an opener disk supported from the drawbar for rotation about a disk axis to form the furrow in the ground, the opener disk having a periphery with leading and trailing edges;
   a material placement boot located on one side of the disk and having a material placement outlet for depositing material in a bottom area of the furrow, wherein the boot, when viewed from a side of the opener in a direction transverse to the forward direction, is located entirely within the periphery of the disk so that the boot is protected against damage by the disk;
   wherein the disk axis is offset from a direction transverse to the forward direction to define a shadow area in the fore and aft direction, and wherein the material placement boot, when viewed from the forward direction, is entirely within the shadow area; and
   wherein the disk includes a hub area adjacent the disk axis and the boot extends substantially greater than 180 degrees around the hub area to provide a generally continuous trash-shedding around the hub area.

36. The opener as set forth in claim 35 wherein the boot includes a forward portion located forwardly of the disk axis, the boot curving downwardly and rearwardly from the forward portion to the material outlet.

37. The opener as set forth in claim 35 including a substantially vertical material delivery tube supported behind the disk axis within the shadow of the disk.

38. An opener for depositing material in a furrow in the ground and for closing the furrow over the material, the opener comprising:
   a fore and aft extending drawbar adapted for movement in a forward direction over the ground;
   an opener disk supported from the drawbar for rotation about a disk axis to form the furrow in the ground, the opener disk having a periphery with leading and trailing edges;
   a material placement boot located on one side of the disk and having a material placement outlet for depositing material in a bottom area of the furrow, wherein the boot, when viewed from a side of the opener in a direction transverse to the forward direction, is located entirely within the periphery of the disk so that the boot is protected against damage by the disk;
   wherein the disk axis is offset from a direction transverse to the forward direction to define a shadow area in the fore and aft direction, and wherein the material placement boot, when viewed from the forward direction, is entirely within the shadow area;
   a substantially vertical material delivery tube supported behind the disk axis within the shadow of the disk; and
   wherein the delivery tube has a cross section which changes in the vertical direction to maintain the tube within the shadow area, wherein the tube includes an upper portion generally circular in configuration, the tube changing to an elliptical cross section near the material placement outlet so that the tube is maintained within the shadow for a disk axis offset as small as five degrees while maintaining a material throughput capability sufficient for planting at speeds above five miles per hour.

39. An opener for depositing material in a furrow in the ground and for closing the furrow over the material, the opener comprising:
   a fore and aft extending drawbar adapted for movement in a forward direction over the ground;
   an opener disk supported from the drawbar for rotation about a disk axis to form the furrow in the ground, the opener disk having a periphery with leading and trailing edges;
   a material placement boot located on one side of the disk and having a material placement outlet for depositing material in a bottom area of the furrow, wherein the boot, when viewed from a side of the opener in a direction transverse to the forward direction, is located entirely within the periphery of the disk so that the boot is protected against damage by the disk;
   wherein the disk axis is offset from a direction transverse to the forward direction to define a shadow area in the fore and aft direction, and wherein the material placement boot, when viewed from the forward direction, is entirely within the shadow area;
   a substantially vertical material delivery tube supported behind the disk axis within the shadow of the disk; and
   including a pivot connecting the delivery tube to the drawbar above the disk axis, and a U-shaped spring having side legs supported between the tube and the drawbar urging the tube towards the disk, the side legs extending generally horizontally adjacent the pivot.

40. An opener for depositing material in a furrow in the ground and for closing the furrow over the material, the opener comprising:
   a fore and aft extending drawbar adapted for movement in a forward direction over the ground;
   an opener disk supported from the drawbar for rotation about a disk axis to form the furrow in the ground, the opener disk having a periphery with leading and trailing edges;

a material placement boot located on one side of the disk and having a material placement outlet for depositing material in a bottom area of the furrow, wherein the boot, when viewed from a side of the opener in a direction transverse to the forward direction, is located entirely within the periphery of the disk so that the boot is protected against damage by the disk;

wherein the disk axis is offset from a direction transverse to the forward direction to define a shadow area in the fore and aft direction, and wherein the material placement boot, when viewed from the forward direction, is entirely within the shadow area; and including ground wheel structure supported adjacent the disk including first and second wheels spaced on opposite sides of the disk, wherein the wheels have leading ground engaging portions located forwardly of the trailing edge of the disk and forcing soil down over the material deposited in the furrow before the material can move upwardly from a bottom area of the furrow.

41. The opener as set forth in claim 40 including a pivoting support arm connected to the drawbar and supporting one of the first and second wheels for movement vertically relative to the disk about a wheel pivot axis, the wheel movable with the support arm between a normal working position adjacent the material placement outlet and a trash relieving position located above and outwardly of the normal working position.

42. The opener as set forth in claim 40 including an adjustable arm pivotally connected to the drawbar forwardly of the disk axis, the arm having a trailing end supporting one of the wheels and a leading end for adjusting the vertical location of one of the wheels relative to the disk at a location near a forward most portion of the opener.

43. The opener as set forth in claim 40 wherein the first and second wheels are angled generally in the same direction relative to the forward direction for moving residue from between the wheels and preventing plugging between the wheels and for moving residue towards one side of the opener.

44. An opener for depositing material in a furrow in the ground where trash is present and for closing the furrow over the material, the opener comprising:

a fore and aft extending drawbar adapted for movement in a forward direction over the ground;

an opener disk supported from the drawbar for rotation about a disk axis offset from a direction transverse to the forward direction to form the furrow in the ground, the opener disk having first and second sides, and a periphery with leading and trailing edges;

a first ground engaging wheel supported adjacent the first side of the disk;

a second ground engaging wheel supported adjacent the second side of the disk;

a material placement boot assembly located on the second side of the disk and having a material placement outlet forwardly adjacent ground engaging portions of the first and second ground engaging wheels for depositing the material in the furrow; and wherein the first and second ground engaging wheels are both steered in one direction away from the forward direction to move the trash from between the ground engaging wheels and towards one side of the opener.

45. The opener as set forth in claim 44 wherein the first ground engaging wheel comprises a depth control and opener disk scraping wheel and the second ground engaging wheel comprises a furrow closing wheel, and wherein the first ground engaging wheel also moves soil around the disk to help close the furrow.

46. The opener as set forth in claim 44 wherein the opener disk is also steered in said one direction.

47. The opener as set forth in claim 44 wherein the ground engaging and furrow closing portions of the wheels are offset on opposite sides of the disk forwardly of a rearmost portion of the periphery of the disk and rearwardly of the disk axis.

48. The opener as set forth in claim 44 wherein the furrow has a generally parabolic sidewall, the disk axis is offset from the direction transverse to the forward direction approximately five degrees, and the material placement boot assembly conforms to the furrow sidewall and is maintained substantially entirely within the furrow so the ground outside the furrow sidewall is relatively undisturbed by the boot assembly.

49. The opener assembly as set forth in claim 48 wherein the boot assembly includes a material delivery tube having an outlet end which, when viewed in the forward direction, is protected within a shadow area defined by the angled disk, and when viewed from the side, is entirely within the periphery of the disk so that the disk protects the tube from hard objects in the ground.

* * * * *